April 21, 1959  L. L. FREDERICK  2,882,690
PILE HAMMER OPERABLE WITH EITHER DIESEL OR DROP HAMMER EFFECT
Filed March 11, 1955  5 Sheets-Sheet 1
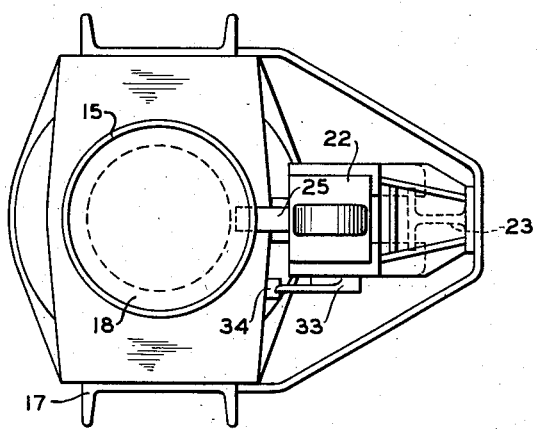
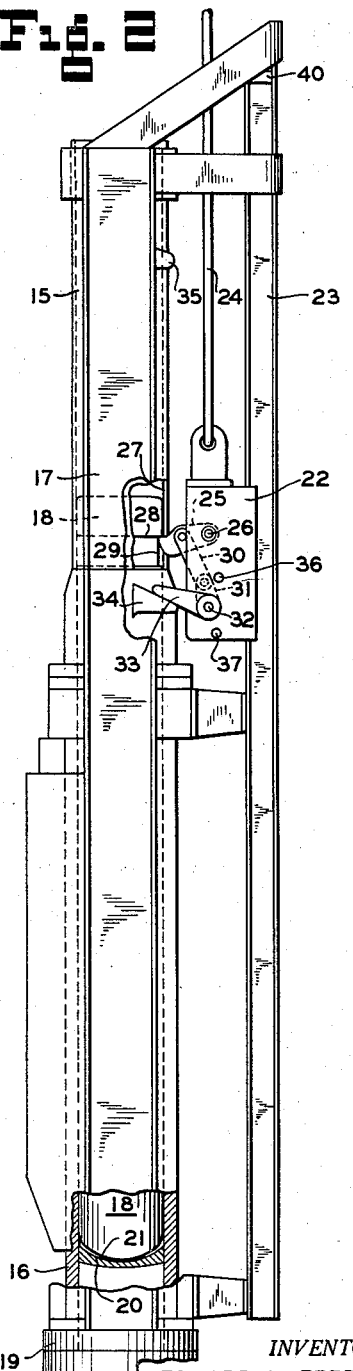
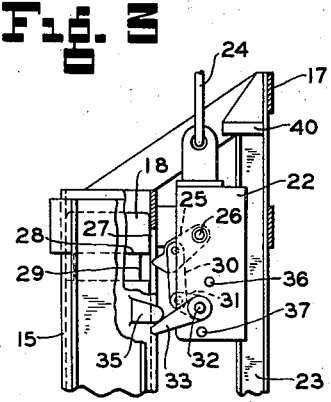
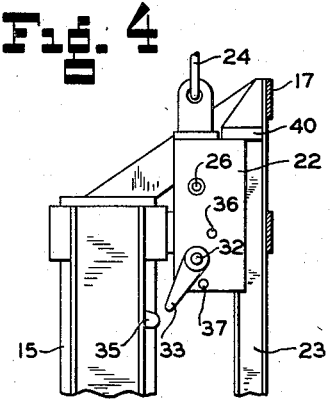
INVENTOR.
LEONARD L. FREDERICK
BY
ATTORNEY April 21, 1959    L. L. FREDERICK    2,882,690
PILE HAMMER OPERABLE WITH EITHER DIESEL OR DROP HAMMER EFFECT
Filed March 11, 1955    5 Sheets-Sheet 2
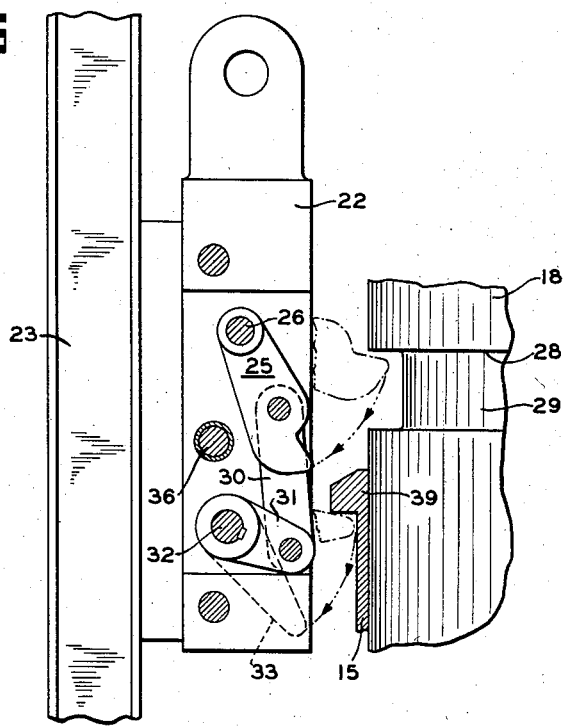
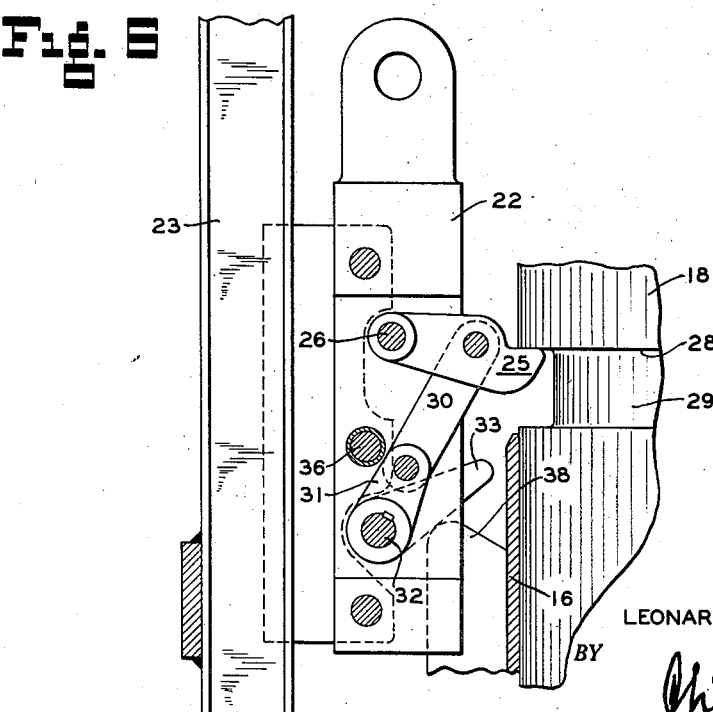
INVENTOR.
LEONARD L. FREDERICK
BY
ATTORNEY

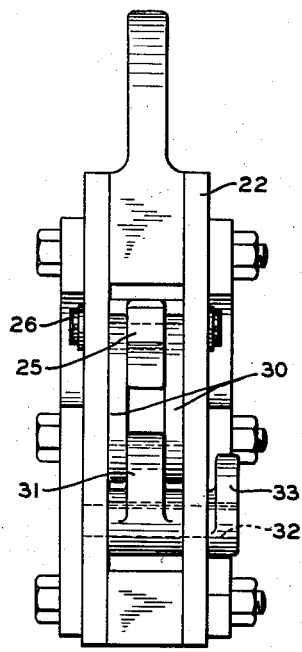
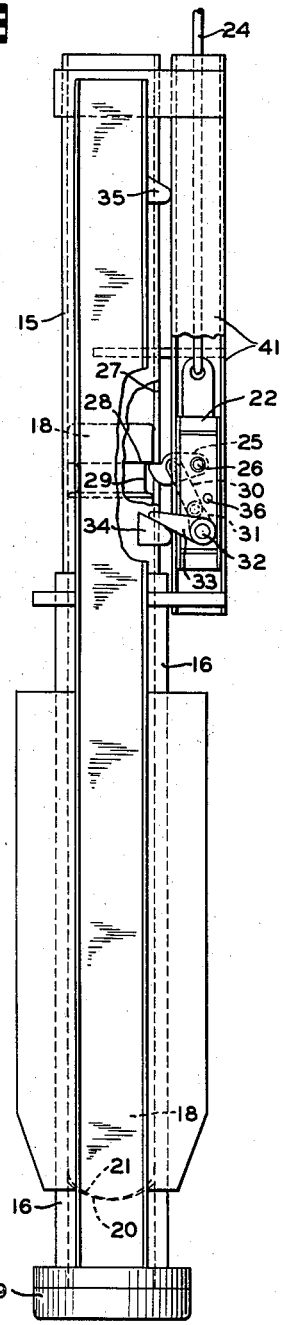
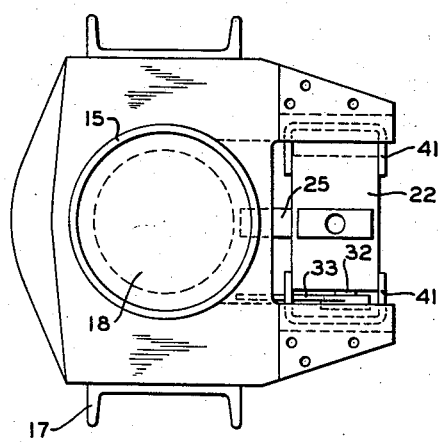

April 21, 1959   L. L. FREDERICK   2,882,690
PILE HAMMER OPERABLE WITH EITHER DIESEL OR DROP HAMMER EFFECT
Filed March 11, 1955   5 Sheets-Sheet 4

INVENTOR.
LEONARD L. FREDERICK
BY
ATTORNEY

April 21, 1959  L. L. FREDERICK  2,882,690
PILE HAMMER OPERABLE WITH EITHER DIESEL OR DROP HAMMER EFFECT
Filed March 11, 1955  5 Sheets-Sheet 5
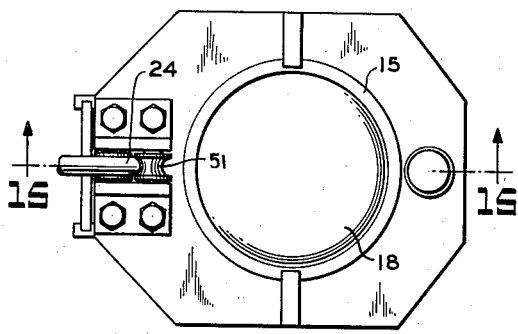
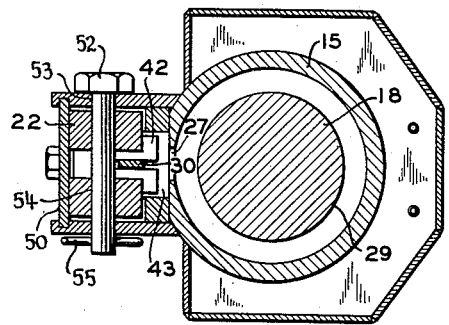
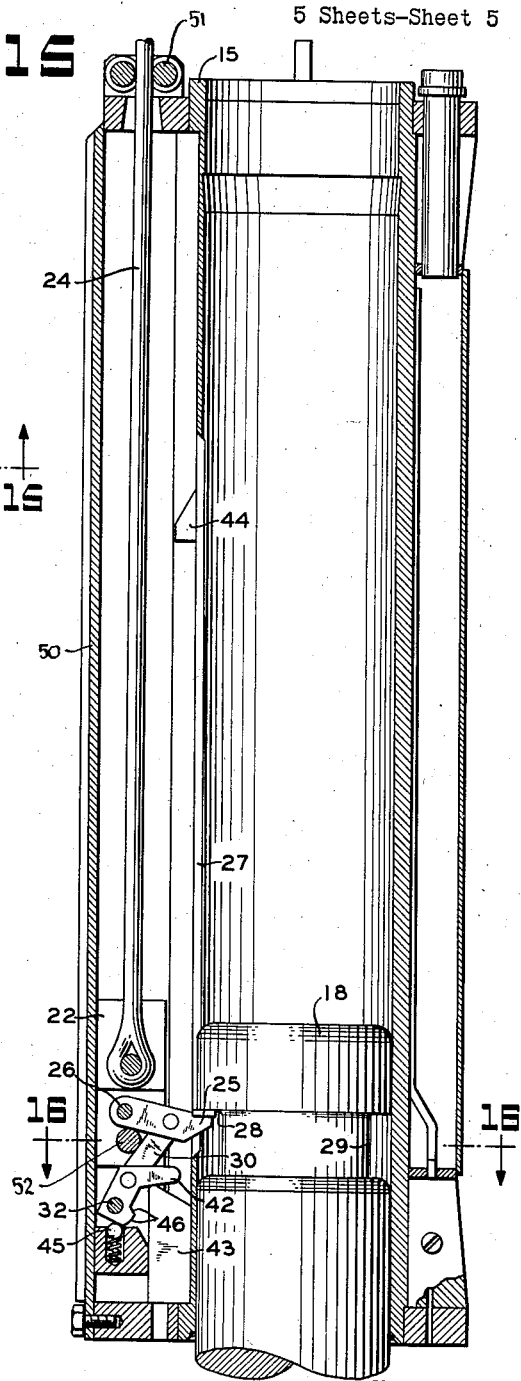
INVENTOR.
LEONARD L. FREDERICK
BY
ATTORNEY United States Patent Office 2,882,690
Patented Apr. 21, 1959

2,882,690

PILE HAMMER OPERABLE WITH EITHER DIESEL OR DROP HAMMER EFFECT

Leonard L. Frederick, Sherman Oaks, Calif., assignor to McKiernan-Terry Corporation, Harrison, N.J., a corporation of New Jersey Application March 11, 1955, Serial No. 493,758

1 Claim. (Cl. 61—76)

The invention disclosed in this patent application relates to pile driving hammers.

Hammers operating on the diesel principle, while having many advantages, have at least one distinct disadvantage in that they may fail to fire if the pile resistance is insufficient to develop ignition pressure in the hammer cylinder under fall of the ram.

One of the main objectives here is to provide a hammer operating on the diesel principle which in the event of failure to fire may be then operated as a drop hammer utilizing the full combined weight of hammer cylinder and ram or the weight of the ram alone to drive until pile resistance sufficient to provide necessary ignition pressure is developed.

It is a further purpose of the invention to provide such a hammer in a simple, practical, rugged form, operable and controllable to change over from diesel to drop hammer operation and from drop hammer back to diesel operation in accordance with changing conditions.

Another important object of the invention is to provide a hammer which will be safe to operate at all times, particularly in that there will always be a hoist line connected with the hammer and by which it can be safely controlled. An important object of the invention is to enable all operations of the hammer to be controlled or effected by a single hoist rope.

Another object of the invention is to provide simple, practical and easily applied means for positively locking the ram and other movable parts of the hammer when lowered for transportation or other purposes.

The foregoing and other desirable objects are attained by novel combinations and relation of parts including a trip block mounted for travel longitudinally on the hammer cylinder and carrying catch mechanism operable when fully lowered to connect with the ram and automatically released at the top of the stroke to drop the ram, and said trip block having further possible upward movement in which it may be caused to pick up the cylinder, thus to lift the hammer as a unit for drop hammer operation and said trip block being further operable, if desired, to leave the cylinder rested on the pile and to operate the ram only with drop effect.

An important feature of this novel combination is that the entire action may be effected and governed by a single hoist line attached to the trip block, enabling use of a single drum crane.

Other desirable objects attained by the invention and further novel features of construction and combination of parts are set forth or will appear in the course of the following specification.

The drawings accompanying and forming part of the specification illustrate certain present practical embodiments of the invention. Structure, however, may be further modified and changed as regards the present disclosure, all within the true intent and broad scope of the invention as hereinafter defined and claimed.

Fig. 1 in the drawings is a top plan view of one of the pile hammer units;

Fig. 2 is a broken and part sectional side elevation of the same on a smaller scale, with the ram and trip block both at bottom and the catch mechanism triggered into lifting engagement with the ram;

Fig. 3 is a fragmentary part sectional view illustrating the trip block at top stroke and triggered to drop the ram;

Fig. 4 is a view similar to Fig. 3 but showing the trip block lifted further into engagement with a stop on the frame of the hammer to lift the hammer as a whole;

Figs. 5 and 6 are broken sectional views on a somewhat larger scale, of modifications in the form of the trip mechanism, showing the upper and lower stationary trips carried by the upper and lower cylinders of the hammer;

Fig. 7 is a front view of the trip block appearing in Figs. 5 and 6;

Figs. 8 and 9 are top plan and broken side elevational views, respectively, of a modified and more compacted form of the invention;

Fig. 14 is a top plan view of a completely enclosed form of the invention;

Fig. 15 is a broken vertical sectional view of the same on substantially the plane of line 15—15 of Fig. 14, showing the trip mechanism locked to the ram and the trip block locked in the guide;

Fig. 16 is a horizontal sectional view on substantially the plane of line 16—16 of Fig. 15.

Figure 11:
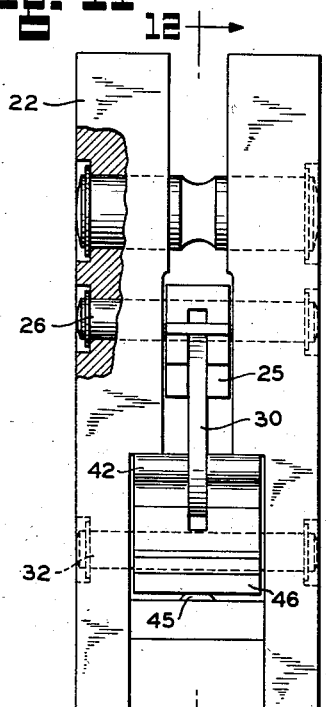
Figs. 10, 11, 12 and 13 are illustrative of another embodiment of the trip block, Fig. 10 being a top plan, Fig. 11 a broken part sectional front elevation, Fig. 12 a vertical sectional view on line 12—12 of Fig. 11 with the catch lever extended, and Fig. 13 the same as Fig. 12, with the catch lever retracted.
Figure 10:
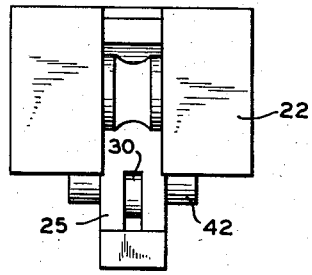

In the several views the body of the machine is shown made up of connected upper guide cylinder 15 and lower working cylinder 16 in a framework 17 and containing a piston or ram 18.

The frame may carry guide shoes to ride over the leads usually provided for directing the hammer down over the pile or piling, but as these are more or less conventional and vary in character, they have not been shown.

The cylinder is closed at the lower end by an anvil block 19 having a concave cavity 20 cooperative with the rounded lower end 21 of the ram to form, with the surrounding wall of the cylinder, a compression ignition chamber for diesel operation.

Fuel injection mechanism and other details necessary for the diesel action are not shown, being well known in the art, as exemplified by Haage 2,305,772 of December 22, 1942.

The trip block, which may be selectively coupled to the ram or to the cylinder, is designated 22 and is shown as arranged to slide over a guide 23 carried by the frame in back of the cylinder structure.

The hoisting rope for raising the ram or for lifting the hammer as a whole, is shown at 24 connected with the top of the trip block.

The coupling between the trip block and ram consists, in the illustration, of a catch or lifting lever 25 pivoted in the block at 26, in position to project through a slot 27 in the guide cylinder into engagement with a shoulder 28 forming the upper edge of an annular groove 29 in the ram, said lever being sustained by a toggle like 30 pivoted to a toggle arm 31 on rocker shaft 32. The latter is shown pivoted in the lower end of the trip block and as carrying a projecting trigger or actuating lever 33 at the outer end engageable at the end of the down stroke with a stationary stop 34 to set the toggle to effect connection with the ram as in Fig. 2, and engageable with a stationary stop 35 at the top of the stroke, Fig. 3, to break the toggle and release the ram.

A stationary stop 36 on the trip block prevents overthrow of the intermediate connection or knuckle portion of the toggle, and overthrow of the toggle in the opposite direction may be prevented by a stop such as indicated at 37.

The lower and upper stops 34, 35 for tripping the coupling or connecting lever 25 into and out of connection with the ram, may be mounted on the cylinder or be integral projections or portions of the cylinder.

Thus, as shown in Figs. 5 and 6, the lower trip for effecting coupling engagement of the trip block with the ram may be a bevel shoulder 38 on the upper end of the working cylinder 16, and the upper trip be an angular projection 39 of the upper guide cylinder 15, both disposed in position for engagement by the trigger finger or lever 33.

Figs. 2 and 6 show how the trigger is thrown at the lower end of the trip block movement to effect connection with the ram, and Figs. 3 and 5 show how the trigger is tripped at the upper end of the block movement to break the toggle and effect release of the ram.

If compression ignition results from fall of the ram the hammer will start operation as a diesel engine. If, however, the resistance to penetration is insufficient for the necessary buildup of ignition pressure, the lifting and dropping cycle may be repeated and this as often as considered desirable or necessary by using the rope to lift the tripblock and drop the ram single stroke operation.

The present invention, furthermore, makes it possible to counteract failure of deisel cycling and restore such operation by dropping both cylinder and ram with drop hammer effect until a point of penetration resistance is reached sufficient to support the compression ignition actuation.

This is accomplished by lifting the trip block to a further position, Fig. 4, beyond the ram releasing point shown in Fig. 3 where, after having let go the ram, it will engage a stop or shoulder 40 on the upper end of the frame and cylinder structure. Further pull on the hoist rope 24 will then serve to lift cylinder and ram as a solid unit which may be dropped with full pile driver effect.

The invention thus makes it possible to accomplish operation and control of both diesel and drop hammer action and the lifting and lowering of the full hammer equipment with a single hoisting rope.

Figs. 8 and 9 show how the hammer may be compacted and reduced to smaller transverse cross-section by locating the trip block closer to the cylinder and operating it in channel guides 41 immediately in back of the upper guide cylinder 15, above the lower, working cylinder 16.

Figs. 10 to 13 illustrate a variation of the releasable catch mechanism in which the trigger finger, in this instance designated 42, is provided as an integral extension of the lower toggle lever or link 31.

Figure 12:
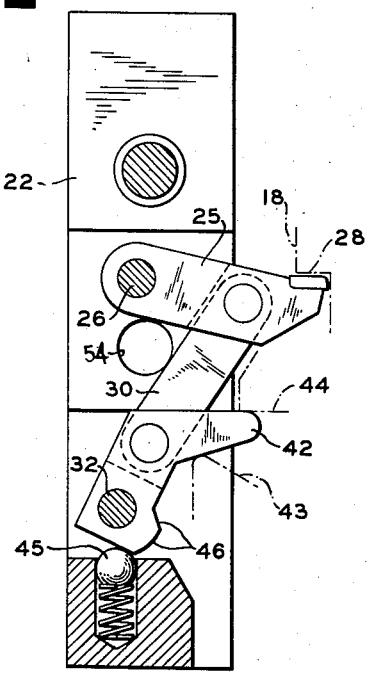

Fig. 12 is in effect a composite view showing how the trigger extension 42 of the lower toggle lever projects to engage a bottom trip 43 to extend and lock the toggle with the lifting lever in engagement with the shoulder on the ram and to engage the upper shoulder 44 to break the toggle and release the ram.

Figure 13:
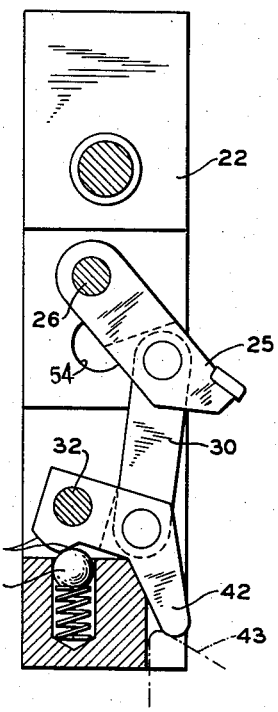

The latter result is indicated in Fig. 13 and both these views show how the toggle may be held in either extended or retracted position by a spring pressed ball detent 45 engaged with oppositely inclined cam faces 46 on the lower end of the lower toggle lever 31.

While identified and particularly designed as a pile hammer, it will be realized that the invention relates to internal combustion percussion tools generally and is to be so considered.

The further movement of the trip block from the ram release position shown in Fig. 3 to the cylinder pick-up position shown in Fig. 4 insures that the ram will be dropped or be at the bottom of the cylinder when the unit is lifted by the hoist rope for drop hammer operation or for shifting the hammer from one pile to another.

For transportation from one location to another the ram and trip block may be locked together at the bottom of the cylinder by leaving the trip block in the lowered position shown in Fig. 2, with the toggle holding the catch lever 25 extended into engagement in the groove 29 in the upper end of the ram.

The ability to accomplish all operations and to instantly shift from diesel to drop hammer or from drop hammer back to diesel action without making any mechanical changes and entirely with only the single hoist line, has many advantages as to simplicity of structure and savings in time and manpower.

The single hoist line operation enables the hammer to be used with any ordinary crane, since these usually have only two lines and the hammer then leaves one line free for hoisting and handling piles, etc.

Another important feature is that the hoist line, differing from prior constructions, remains connected at all times with the hammer under all operating conditions, so that the hammer cannot get away in case of collapse of piling or other such accident.

While the invention makes it possible to use the full weight of both cylinder and ram for drop hammer operation, it is possible just to use the ram for drop hammer operation by lifting and lowering the trip block only to the extent necessary to catch the ram at the bottom and then lift and release it at the top.

Further special advantages are present in the form of the invention illustrated in Figs. 14, 15 and 16, in that the guide or lead 50 for the trip block is boxed in to completely enclose the trip block, protecting the parts and assuring proper lubrication.

Guide sheaves 51 for the rope are shown located at the top of the guide column to maintain direct line pull on the trip block and to avoid chafing or wear on the rope.

This enclosed guide column provides a simple and practical form of lock for securing the ram and trip block in respect to the cylinder.

This lock comprises a pin 52 which when the ram is lowered in the cylinder can be passed through registering openings 53, 54 in the guide column and trip block, respectively, and which are so disposed as to locate the pin directly in back of the toggle links holding the catch lever extended in engagement with the ram.

When, therefore, the hammer is down for transportation, the ram and trip block may be secured in fixed relation in respect to the cylinder by simply inserting the locking pin through the registering openings in the guide column and trip block. To prevent possible dislodgment the locking pin may be secured in the holding position as by a cotter-pin 55 or the like.

What is claimed is:

In a diesel power hammer of the type embodying a cylinder having an anvil, a ram operating in said cylinder in cooperation with said anvil, a guide on the side of the cylinder and a trip block operable in said guide and provided with a ram lifting hook adapted to be projected through a slot in the cylinder into lifting engagement with the ram and to be retracted to drop the ram in the cylinder, the improvement comprising the provision of a trip lever on said trip block connected with said lifting hook to effect the projection and retraction of the same into and out of engagement with the ram, a fixed stop on the cylinder near the lower end of said guide positioned for engagement by said trip lever in the downward movement of said trip block to impart projecting movement of the lifting hook into engagement with the ram, an upper fixed stop on the cylinder below the upper end of said guide positioned for engagement by said trip lever in the upward travel of said trip block to impart ram releasing retracting movement to said lifting hook and to clear the trip lever of said upper stop to permit further upward travel of the trip block beyond the point where the ram is released, a stop for lifting the hammer at the upper end of said guide positioned for engagement by said trip block in the further upward movement of the trip block after releasing the ram and a single rope extending down through said guide and connected with said trip block for lifting and lowering said trip block or the trip block and ram or for lifting the hammer as a whole and whereby said single rope may be used for lifting and lowering the trip block alone or the trip block connected with the ram or to lift and drop the ram to initiate diesel operation, or, after dropping the ram, be used to lift the trip block further to pick up and lift the hammer as a whole.

References Cited in the file of this patent

UNITED STATES PATENTS

| | | |
|---|---|---|
| 1,957,999 | Goldsborough et al. | May 8, 1934 |
| 2,128,584 | Haage | Aug. 30, 1938 |
| 2,633,832 | Spurlin | Apr. 7, 1953 |
| 2,804,856 | Spurlin | Sept. 3, 1957 |

FOREIGN PATENTS

| | | |
|---|---|---|
| 33,746 | Germany | of 1885 |
| 609,454 | Germany | Feb. 20, 1935 |
| 764,217 | Germany | July 3, 1952 |
| 885,678 | Germany | Aug. 6, 1953 |